(12) United States Patent
Lee

(10) Patent No.: US 7,271,519 B2
(45) Date of Patent: Sep. 18, 2007

(54) LAMINATED BODY OF MOTOR AND MANUFACTURING METHOD THEREOF

(75) Inventor: Seung-Weon Lee, Gimhae (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/952,895

(22) Filed: Sep. 30, 2004

(65) Prior Publication Data

US 2005/0073211 A1    Apr. 7, 2005

(30) Foreign Application Priority Data

Oct. 2, 2003  (KR)  ........................ 10-2003-0068788
Feb. 23, 2004  (KR)  ........................ 10-2004-0011994

(51) Int. Cl.
*H02K 1/00*     (2006.01)
(52) U.S. Cl. ................... 310/216; 310/217; 310/254
(58) Field of Classification Search ........ 310/216–218, 310/254, 258, 259
See application file for complete search history.

(56) References Cited

U.S. PATENT DOCUMENTS

| | | | | |
|---|---|---|---|---|
| 2,975,312 | A | * | 3/1961 | Ploran ........................ 310/217 |
| 3,577,851 | A | * | 5/1971 | Detheridge et al. ........... 29/596 |
| 4,395,815 | A | * | 8/1983 | Stanley et al. ................ 29/598 |
| 4,613,780 | A | * | 9/1986 | Fritzsche .................... 310/216 |
| 4,665,329 | A | * | 5/1987 | Raschbichler ................ 310/13 |
| 5,489,811 | A | * | 2/1996 | Kern et al. .................. 310/216 |
| 6,313,558 | B1 | * | 11/2001 | Abukawa et al. ........... 310/254 |
| 6,448,682 | B2 | * | 9/2002 | Sakagami et al. .......... 310/216 |
| 6,559,572 | B2 | * | 5/2003 | Nakamura ................... 310/254 |
| 6,700,295 | B2 | * | 3/2004 | Kanno et al. ............... 310/261 |

FOREIGN PATENT DOCUMENTS

JP            11-178298 A       7/1999

OTHER PUBLICATIONS

English language abstract for JP 57-075551 (May 12, 1982).
English language abstract for JP 57-100823 (Jun. 23, 1982).

* cited by examiner

*Primary Examiner*—Dang Le
(74) *Attorney, Agent, or Firm*—Birch, Stewart, Kolasch & Birch, LLP

(57) ABSTRACT

A laminated body of a motor includes: a yoke spirally laminated to form a hollow cylindrical shape; a plurality of teeth protruding from one side edge of the yoke disposed along a longitudinal direction of the yoke and being separated apart at a predetermined distance; a plurality of notch portions on an opposite side edge of the yoke, each of the plurality of notch portions being aligned with each of the plurality of teeth; a stopping protrusion extendingly formed at a protruding end of the teeth in the longitudinal direction of the yoke; and an inclined portion having an inclined surface formed by decreasing a width of the stopping protrusion toward an end of the stopping protrusion so as to reduce cogging torque.

5 Claims, 6 Drawing Sheets

LAMINATED BODY OF MOTOR AND MANUFACTURING METHOD THEREOF

This Nonprovisional application claims priority under 35 U.S.C. § 119 (a) on patent application Ser. No(s). 10-2003-0068788 and 10-2004-0011994 filed in Korea on Oct. 2, 2003 and Feb. 23, 2004, the entire contents of which are hereby incorporated by reference.

BACKGROUND OF THE INVENTION

1. Field of the Invention

The present invention relates to a laminated (stacked) body of a motor, and particularly, to a laminated body of a motor and its manufacturing method capable of reducing cogging torque in operation of the motor, making no thermal deformation and improving productivity.

2. Description of the Background Art

A conventional motor laminated body of this type is manufactured by stacking a plurality of ring-shaped board members blanked directly from a steel board, as disclosed in JP 57-100823, for instance. However, yield of materials is low. For this reason, JP 57-75551 discloses a method for improving the yield in such a manner that a belt-shaped board member with a large number of teeth is spirally wound and undergoes plastic deformation, and several layers are fastened by welding the respective layers.

In FIGS. 1 and 2, another laminated body, which has a similar structure to the above-mentioned structure, of a motor according to the conventional art, is depicted. FIG. 1 is a perspective view for explaining a laminated state of a laminated (stacked) body of a conventional motor, and FIG. 2 is a plan view showing a laminated body whose lamination is completed, of a motor.

As shown, the laminated body 10 of the motor includes a yoke part 20 having a ring shape; and a plurality of teeth parts 30 protruding from an outer side of the yoke part 20 along a radial direction and disposed in an isolated manner at predetermined intervals so that a winding coil (not shown) can be wound therearound. A stopping protrusion 35 is formed at an end of each teeth part 30 by widening a width of the teeth part so that the wound winding coil is not detached from its mounted position. The stopping protrusion 35 is extendingly formed in a perpendicularly direction to the teeth part 30. As for such a laminated body 10, the belt-shaped yoke part 20 and the teeth part 30 are integrally formed and spirally laminated, and then a plurality of welded portions 40 are formed on an inner circumferential surface of the yoke part 20 so that layers are not separated but fixed. In case of an outer teeth type laminated body 10 depicted in FIGS. 1 and 2, a ring-shaped permanent magnet or the like (not shown) is disposed at an outer circumferential surface of the laminated body 10 at almost regular intervals between itself and the stopping protrusion 35 so as to make a relative rotary motion In the motor having such a structure, a rotor is rotated in one direction by interaction between flux (generated by property switching or applying a current to the winding coil) and the permanent magnet or the like.

The laminated body of the conventional motor as described above has the following problems.

First, in coupling of the laminated body 10 by means of welding, a defective measurement may occur due to deformation by heat generated in welding, equipment for welding and cooling is required, and many production hours are consumed on welding and cooling. In addition, the welding processing causes a change of material in quality due to heat, whereby generation of flux in operation of the motor may be interrupted.

In addition, in a laminating process, the yoke part 20 is properly pressed to undergo plastic deformation into a cylindrical shape with a predetermined inner diameter. For this reason, if a width of the yoke part 20 is relatively greater than the inner diameter of the yoke part 20 after the lamination, such plastic deformation is not smoothly made.

Besides, another main problem is that cogging torque is generated by interaction between the laminated body 10 and a permanent magnet. "Cogging" refers to an unsmooth movement between a rotor and a stator, and can be referred to as a kind of a torque change. In general, if a protruding portion of the stopping protrusion 35 (formed at an end of the teeth part 30 in a perpendicular direction to the teeth part 30) is formed to be long, an output of the motor can be advantageously increased, and the cogging torque is reduced so that a noise decrease and a constant speed operation can be realized. However, this method has a limit in that, in case of automatically winding a winding coil, the minimum passage of a winding nozzle for automatic winding should be provided. Accordingly, a ripple of an actual output torque should be decreased while the minimum passage for the winding nozzle is provided. Accordingly, a shape of the conventional stopping protrusion 35 is not inappropriate for decreasing the cogging torque.

SUMMARY OF THE INVENTION

Therefore, an object of the present invention is to provide a laminated body of a motor and its manufacturing method capable of reducing cogging torque in operation of a motor, making no thermal deformation and improvising productivity.

To achieve these and other advantages and in accordance with the purpose of the present invention, as embodied and broadly described herein, there is provided a laminated body of a motor comprising: a yoke part having a belt shape with a long length in comparison with its width and spirally laminated to form a hollow cylindrical shape; a plurality of teeth parts protruding from one side edge of the yoke part in a width direction and disposed along a longitudinal direction in an isolated manner at a predetermined distance; a stopping protrusion extendingly formed at a protruding end of the teeth part in a longitudinal direction of the yoke part; and an inclined portion having an inclined surface formed by decreasing a width of the stopping protrusion toward its end so as to reduce cogging torque.

To achieve these and other advantages and in accordance with the purpose of the present invention, as embodied and broadly described herein, there is provided a method for manufacturing a laminated body of a motor comprising: a first step of forming a plurality of teeth parts protruding from one side edge of a yoke part, which has a belt shape with a long length in comparison with its width, in a width direction and disposed along a longitudinal direction in an isolated manner at a predetermined distance, and manufacturing a protrusion receiving groove recessed in one side of the teeth part in a thickness direction of the teeth part and a coupling protrusion protruding from its other side in a width direction of the teeth part; and a second step of manufacturing a laminated body by spirally laminating the yoke part manufactured in the first step and inserting the coupling protrusion in a neighboring protrusion receiving groove along a thickness direction; and a third step of adherently inserting the coupling protrusion in the lower protrusion receiving groove by pressing the laminated body manufactured in the second step in a thickness direction.

To achieve these and other advantages and in accordance with the purpose of the present invention, as embodied and broadly described herein, there is provided a laminated body of a motor comprising: a yoke part having a belt shape with a long length in comparison with its width and spirally laminated to form a hollow cylindrical shape; a plurality of teeth parts protruding from one side edge of the yoke part in a width direction and disposed along a longitudinal direction in an isolated manner at a predetermined distance; and a protrusion receiving groove recessed in one side of the teeth part along a thickness direction and a coupling protrusion protruding from its other side along the thickness direction of the teeth part to be inserted and fixed by each other The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

A spirit of the present invention may be modified to be used for a rotary motor, such as a BLDC motor, and a linear motor or the like.

Figure 1:
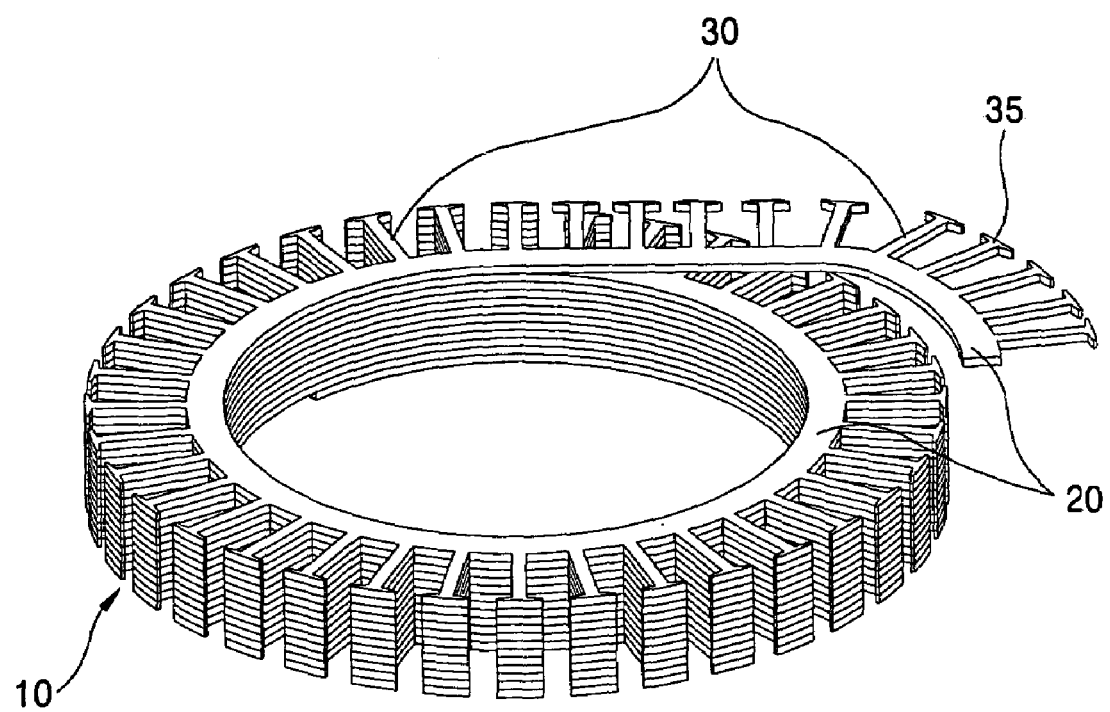
FIG. 1 is a perspective view for explaining a laminated state of a laminated body of a conventional motor.
Figure 2:
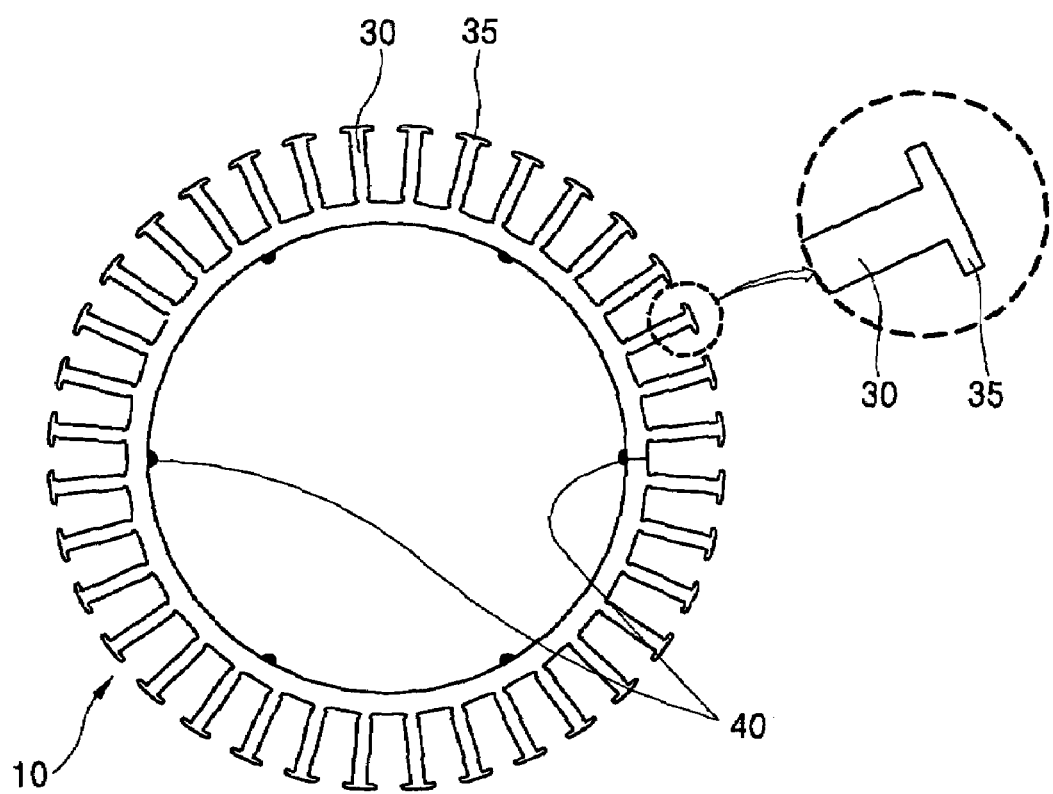
FIG. 2 is a plan view showing a laminated motor whose lamination is completed, of the conventional motor.
Figure 3A:
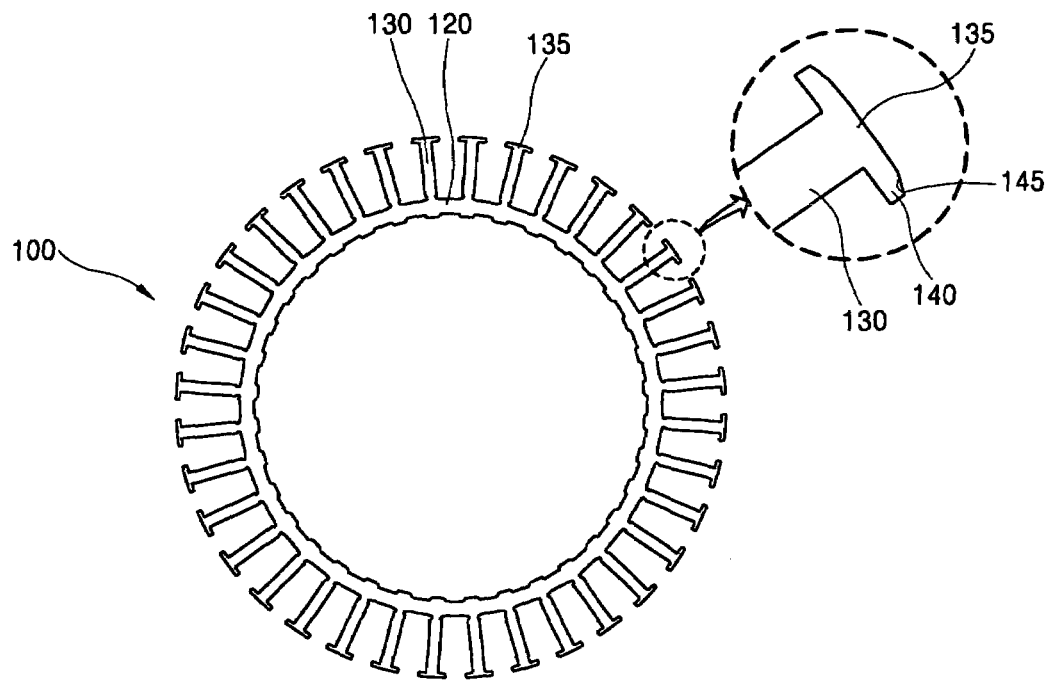
FIG. 3A is a plan view of an outer teeth type motor laminated body according to a first embodiment of the present invention.
Figure 3B:
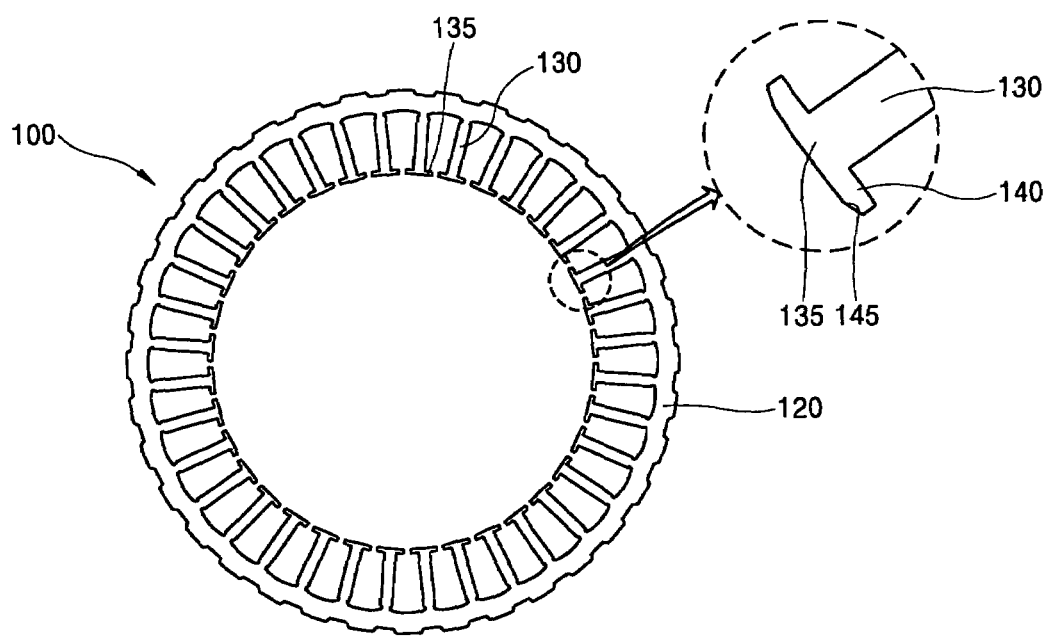
FIG. 3B is a plan view of an inner teeth type motor laminated body according to the first embodiment of the present invention.

FIGS. 3A and 3B are plan views of a laminated body of a motor according to the first embodiment of the present invention.

As shown, the laminated body 100 of the motor according to the present invention includes: a yoke part 120 having a belt shape with a long length in comparison with its width and spirally laminated to form a hollow cylindrical shape; a plurality of teeth parts 130 protruding from one side edge of the yoke part 120 in a width direction and disposed along a longitudinal direction in an isolated manner at predetermined intervals; a stopping protrusion 135 extendingly formed at a protruding end of each teeth part 130 in a longitudinal direction of the yoke part 120; and an inclined portion 145 provided with an inclined surface 140 constructed by reducing a width of the stopping protrusion toward an end of the stopping protrusion 135 to thereby reduce the cogging torque.

Permanent magnets (not shown) may be successively disposed at a circumferential of a laminated body 100 of the motor, forming a cylindrical sectional shape having a through hole. In this case, the permanent magnet may be formed as a stator, and the laminated body 100 of the motor may be formed as a rotor, and the opposite construction is possible according to kinds of the motor, FIG. 3A is a plan view showing an outer teeth type motor laminated body according to the first embodiment, and FIG. 3B is a plan view showing an inner teeth type motor laminated body according to the first embodiment. As shown, the teeth parts 130 may be constructed to face outward or inward along a direction that the yoke part 120 is spirally laminated. In such a manner, the outer teeth type or the inner teeth type motor laminated body may be constructed.

In case of the outer teeth type motor laminated body, a plurality of teeth parts 130 radially protrude in spiral lamination of the yoke part, so that a winding coil (not shown) can be wound therearound.

A stopping protrusion 135 is formed at an end of each teeth part 130 by widening a width of the teeth part 130 so that the wound winding coil cannot be detached from its mounted position.

The stopping protrusion 135 is extendingly formed in an arc shape in a concentric relation to the laminated body at a predetermined interval from the permanent magnet (not shown) disposed outside the laminated body. An inclined portion having an inclined surface 145 whose interval (distance) from the permanent magnet gets wider toward the end of the stopping protrusion 135 is formed at a protruding end of the stopping protrusion.

Figure 4A:
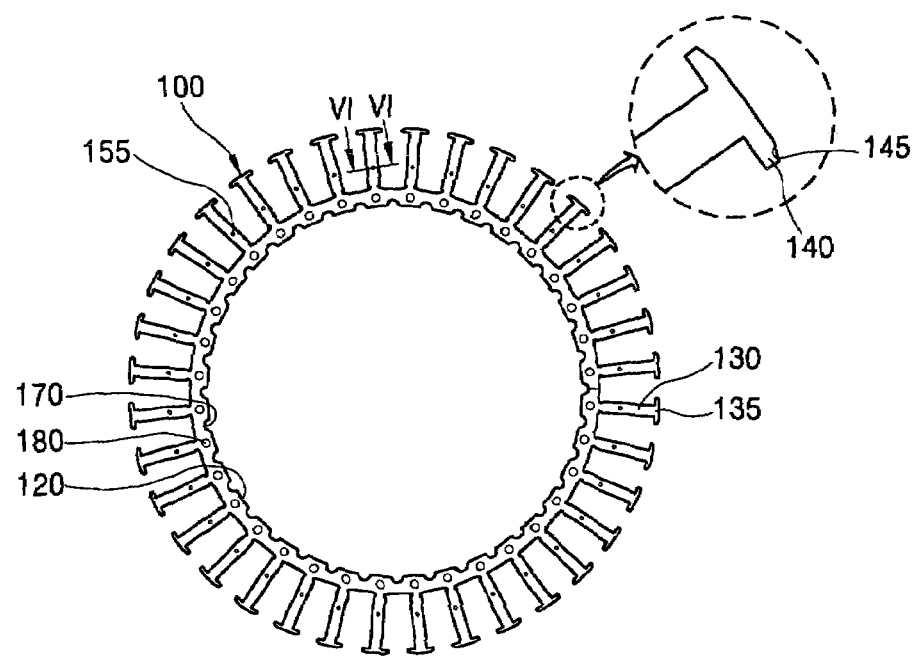
FIG. 4A is a plan view of an outer teeth type motor laminated body according to a second embodiment of the present invention.
Figure 4B:
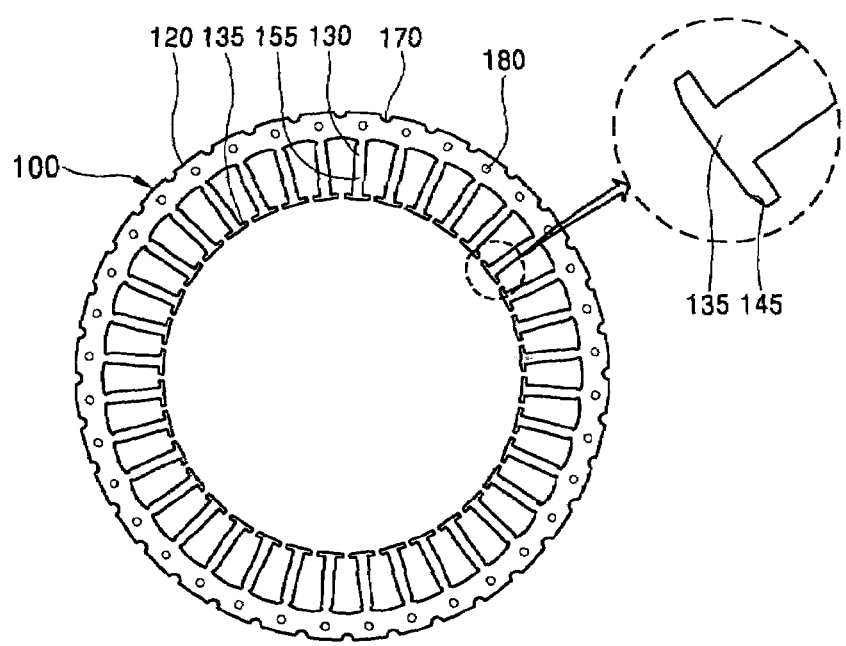
FIG. 4B is a plan view of an inner teeth type motor laminated body according to the second embodiment of the present invention.

FIGS. 4A and 4B are plan views of a laminated body of a motor according to the second embodiment of the present invention. FIG. 4A is a plan view of an outer teeth type motor laminated body according to the second embodiment of the present invention, and FIG. 4B is a plan view of an inner teeth type motor laminated body.

As in the first embodiment, the outer teeth type or inner teeth type motor laminated body may be constructed according to a direction of spiral laminating.

A plurality of pin holes 180 are formed at the yoke part 120, corresponding to the teeth parts 130 respectively, so that guide pins of a laminating device (not shown) are inserted thereinto when the yoke part 120 is spirally laminated. A plurality of notch portions 170 cut in a width direction of the yoke part 120 are formed at an edge of a side opposite to the teeth parts, of the yoke part.

Each notch portion 170 is formed between the teeth parts 130.

Figure 5A:
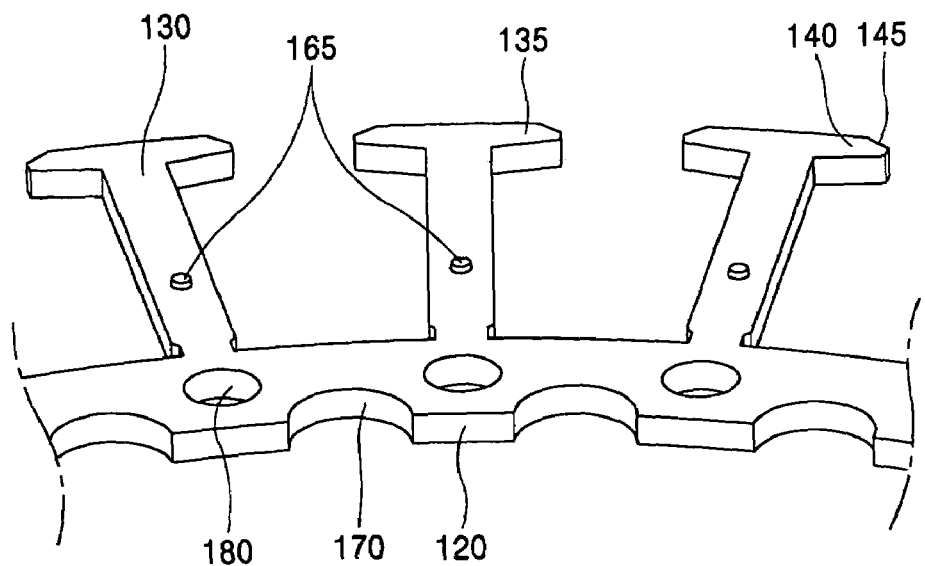
FIG. 5A is a perspective view showing a part of a yoke part according to the second embodiment of the present invention.
Figure 5B:
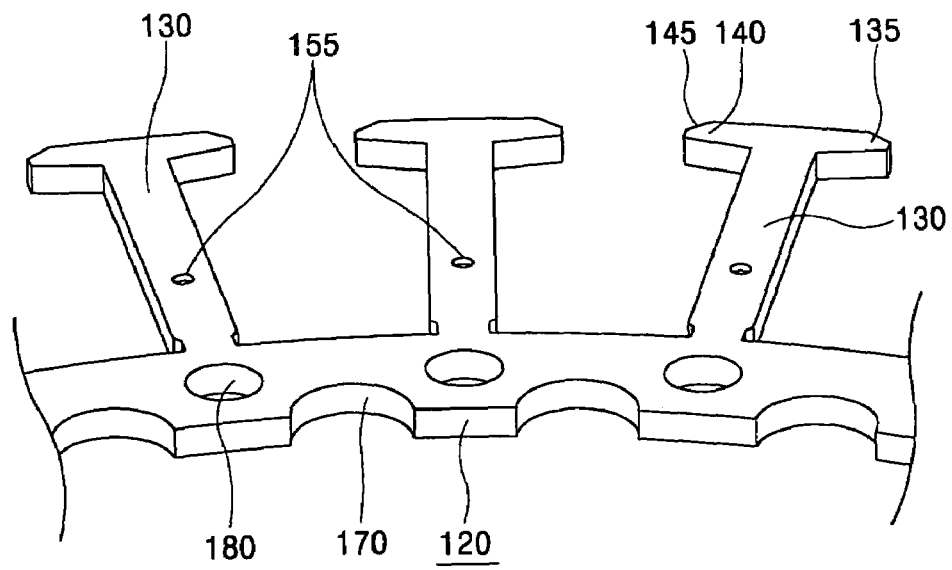
FIG. 5B is a perspective view showing a part of a rear surface of the yoke part according to the second embodiment of the present invention.
Figure 6:
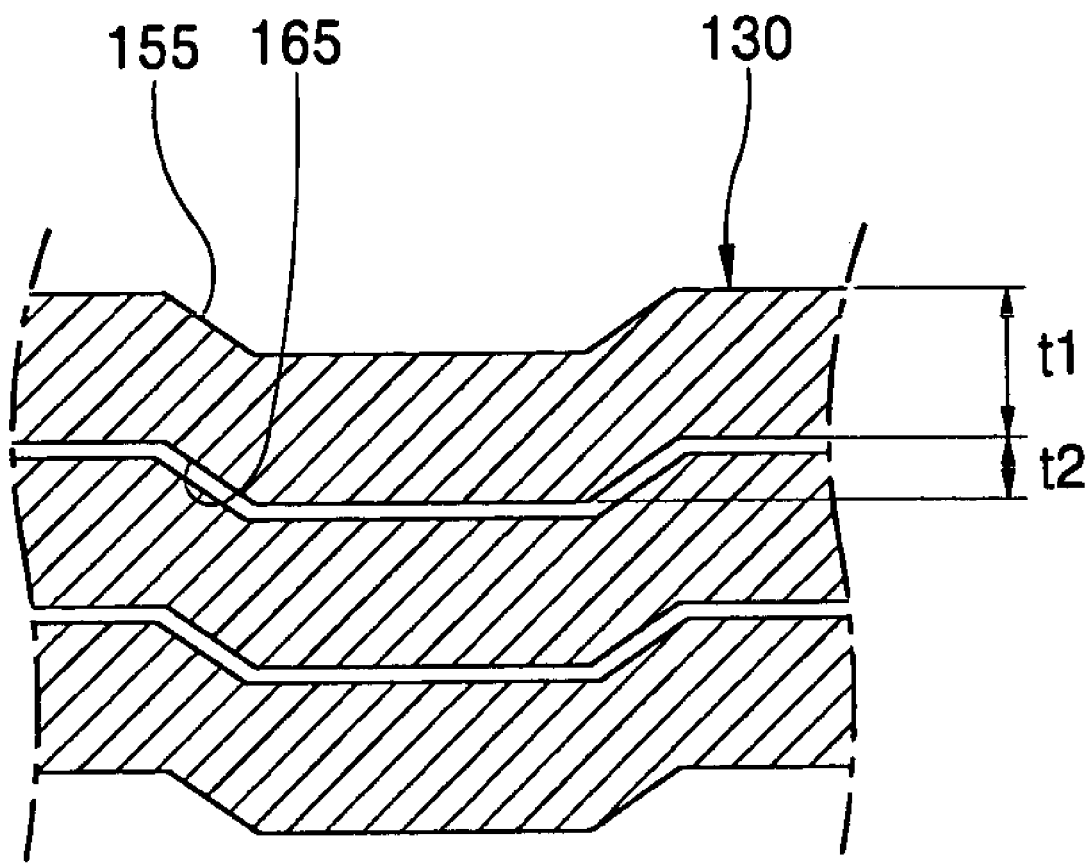
FIG. 6 is a sectional view taken along line VI-VI of FIG. 4A.

FIG. 5A is a perspective view showing a part of the yoke part according to the second embodiment of the present invention, FIG. 5B is a perspective view showing a part of a rear surface of the yoke part according to the second embodiment of the present invention, and FIG. 6 is a sectional view taken along line VI-VI of FIG. 4A.

The teeth part 130 further includes a protrusion receiving groove 155 recessed in one side of the teeth part 130 along a thickness direction and a coupling protrusion 165 protruding from its other side along the thickness direction. Here, the coupling protrusion 165 has a size which does not affect saturation of magnet flux, and its protrusion extent is set to be a thickness (t2) of about ⅓~¼ of a thickness (t1) of the teeth part 130.

Although the coupling protrusion 164 and the protrusion receiving groove 155 with circular sectional shapes are illustrated in the drawing, they may have a quadrangular sectional shape.

A method for manufacturing the laminated body of the motor described above will now be described.

The manufacturing method of the laminated body of the motor includes: a first step of forming a plurality of teeth parts 130 protruding from one side edge of a yoke part 120 (having a belt shape and a long length in comparison with its width) in a width direction and disposed along a longitudinal direction in an isolated manner at predetermined intervals, and manufacturing a protrusion receiving groove 155 recessed in one side of the teeth part 130 and a coupling protrusion 154 protruding from its other side along a thickness direction of the teeth part 130; a second step of manufacturing the laminated body 100 by spirally laminating the yoke part 120 manufactured in the first step and inserting the coupling protrusion into an adjacent protrusion receiving groove 155 along a thickness direction; and a third step of adherently inserting the coupling protrusion 164 in the lower protrusion receiving groove 155 by pressing the laminated body 100 manufactured in the second step.

In the first step, preferably, a linear steel plate undergoes plastic processing by press processing or the like, thereby forming a shape.

The first step preferably includes a step of manufacturing a stopping protrusion 135 formed at an end of the teeth part 130 by widening a width of the teeth part 130 in a longitudinal direction of the yoke part 120, and an inclined portions 140 having an inclined surface 145 formed by reducing the width of the stopping protrusion toward its end so as to reduce the cogging torque.

When an outer teeth type motor laminated body is manufactured, the linear steel plate processed in the first step is supplied to a laminating device (provided with a plurality of guide pins disposed on a circumference with a predetermined side) in a state of the teeth part 130 facing outward and the coupling protrusion 165 facing downward. When the guide pins disposed on the same circumference are sequentially inserted in the pin holes 180 formed at a front end portion of the yoke part 120 along a direction that the linear steel plate is supplied, the linear yoke part 120 is bent into an arc shape by interaction with the guide pin and being centered (pivoted) about the notch portions 170 and then undergoes plastic deformation, thereby forming a circular shape when the laminating device rotates one time. If the laminating device keeps rotating, the linear steel plate is sequentially laminated on the lowest layer. Here, the coupling protrusion 165 of each teeth part 130 is inserted in the protrusion receiving groove 155 of each lower teeth part 130, so that the teeth parts 130 are aligned in a thickness direction. When the lamination of the linear steel plate is completed, the resulting body is pressed in the thickness direction so that each coupling protrusion 165 are adherently inserted in each protrusion receiving groove 155 of lower teeth parts, thereby preventing separation.

Hereinafter, operational effect of the present invention will now be described.

As in the conventional art, in the motor having such a structure, a rotor is rotated in one direction by interaction between flux generated by properly switching or applying a current to a winding coil and a permanent magnet or the like.

In the laminated body of the motor constructed as described above, because the stopping protrusion 135 has the inclined portion inclined toward the central portion of the laminated body as it goes to its end, an interval (distance) between the stopping protrusion and the permanent magnet or the like, which is disposed outside the laminated body, is changed, thereby reducing the cogging torque. A length of slot open which affects noise generated due to the cogging torque in rotation of the motor, namely, an interval between the neighboring stopping protrusions 135 formed at ends of the teeth parts 130, provides a minimum passage for a winding nozzle for automatic winding of a winding coil while the cogging torque is reduced.

In addition, in a laminated body of a motor and its manufacturing method according to the present invention, by excluding welding operation in processing operation, thermal deformation does not occur, equipment investment can be reduced, and a production time can be shortened, unlike the conventional art having problems such as defective measurement due to thermal deformation, many uses of equipment such as welding equipment and cooling equipment, and extending production time in relation to the welding and cooling.

Also, by providing a plurality of notch portions formed by cutting the yoke part in its width direction, plastic deformation of the laminated body of a motor can be made smoothly when the yoke part is laminated.

As so far described, in the present invention, defective measurement due to deformation by heat generated in welding can be prevented by excluding a welding process, equipment for welding and cooling is unnecessary, and a production time is shortened according to the exclusion of the welding and cooling process.

Also, in the present invention, in case of automatically winding a winding coil, a ripple of actual output torque can be reduced while a minimum passage of a winding nozzle for automatic winding is provided.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A laminated body of a motor comprising:

a yoke having a belt shape with a length longer than a width of the yoke, the yoke being spirally laminated to form a hollow cylindrical shape;

a plurality of teeth protruding from one side edge of the yoke, the plurality of teeth being disposed along a longitudinal direction of the yoke and being spaced apart at a predetermined distance;

a stopping protrusion extendingly formed at a protruding end of each of the teeth in a longitudinal direction of the yoke;

a plurality of pin holes formed at the yoke at regular intervals, each of the plurality of pin holes corresponding to one of the plurality of teeth; and a protrusion receiving groove recessed in one side of each of the teeth along a thickness direction of the teeth and a coupling protrusion protruding from an opposite side of each of the teeth along the thickness direction to be inserted into the protrusion receiving groove, the protrusion receiving groove and the coupling protrusion being positioned at a middle portion between the corresponding stopping protrusion and the corresponding pin hole.

2. The laminated body of claim 1, wherein the yoke is spirally laminated with the teeth facing outward.

3. The laminated body of claim 1, wherein the yoke is spirally laminated with the teeth facing inward.

4. The laminated body of claim 1, wherein the yoke further comprises a plurality of notch portions, the plurality of notch portions being on an opposite side edge of the yoke and being disposed along the longitudinal direction of the yoke, each of the plurality of notch portions being aligned with each of the plurality of teeth.

5. The laminated body of claim 4, wherein each notch portion is formed between the teeth.

* * * * *